United States Patent
Watanabe

[19]

[11] Patent Number: 5,862,307
[45] Date of Patent: Jan. 19, 1999

[54] COMMUNICATION APPARATUS USED WITH A PLURALITY OF DIFFERENT CIRCUITS

[75] Inventor: Keiji Watanabe, Yamatokoriyama, Japan

[73] Assignee: Sharp Kabushiki Kaisha, Osaka, Japan

[21] Appl. No.: 769,991

[22] Filed: Dec. 19, 1996

[30] Foreign Application Priority Data

Mar. 25, 1996 [JP] Japan ................................. 8-068755

[51] Int. Cl.⁶ ................................................. H04N 1/32
[52] U.S. Cl. ............................ 395/114; 358/468; 271/287
[58] Field of Search ........................... 395/113–116, 101; 358/442, 468, 434–440, 404, 444; 271/287–292; H04N 1/32

[56] References Cited

U.S. PATENT DOCUMENTS

| | | | |
|---|---|---|---|
| 5,253,077 | 10/1993 | Hasegawa et al. | 358/404 |
| 5,602,973 | 2/1997 | Nishiwaki | 395/113 |
| 5,640,250 | 6/1997 | Yoshida | 358/468 |
| 5,684,864 | 11/1997 | Shibata | 358/468 |

FOREIGN PATENT DOCUMENTS 4185071 7/1992 Japan .

Primary Examiner—Kim Yen Vu

[57] ABSTRACT

An object of the invention is to provide a communication apparatus connected to a plurality of circuits in which recording paper on which received image data is printed is discharged to discharge trays which are individually provided for the respective circuits, so that the discharged sheets of recording paper are easily classified. A communication apparatus used individually in connection with a plurality of circuits is constituted so that received image data is printed on recording paper and is discharged to trays which are individually provided for the respective circuits. Specifically, when the printing of the image data is instructed, the tray number which is allowed to correspond to the reference circuit identification information memorized in the table for the tray selection which coincides with the circuit identification information memorized in the control table of the received information of the parameter memory part. The recording paper on which the image data is printed is discharged to the tray having the selected number. Consequently the printed recording paper is discharged to trays which are individually provided for the respective circuits, so that the sheets of recording paper can be easily classified by circuit.

4 Claims, 5 Drawing Sheets

COMMUNICATION APPARATUS USED WITH A PLURALITY OF DIFFERENT CIRCUITS

BACKGROUND OF THE INVENTION

1. Field of the Invention

The present invention relates to a communication apparatus such as a facsimile communication apparatus or the like used in connection with a plurality of circuits.

2. Description of the Related Art

Communication apparatuses include, for example, a facsimile communication apparatus used in connection with a telephone circuit. In the case of transmitting information with a facsimile communication apparatus, the facsimile communication apparatus reads image data which is information to be transmitted, with a scanner and codes the data to transmit. Furthermore, in the case of receiving information, the facsimile communication apparatus decodes the image data received to print out from a printer. A data transmitting operation and a data receiving operation are carried out in accordance with predetermined communication control procedures, and for this purpose, the facsimile communication apparatus is provided with a communication control circuit. An art of constituting a communication system by individually connecting a plurality of communication control circuits and a plurality of telephone circuits is already well known, however, in such an art, recording paper on which the image data is printed is discharged to a predetermined discharge tray.

Furthermore, there is disclosed, for example, in Japanese Unexamined Patent Publication JP-A 4-185071, an example of a facsimile machine which has a plurality of recording media such as, for example, a printing device, an IC memory, and a magnetic recording medium which records and outputs image data which is received information so that the recording medium is designated with an instruction from the facsimile machine.

In the communication apparatus constituted in connection with the plurality of telephone circuits, the recording paper on which the received image data is printed is discharged to a predetermined discharge tray. However, since the communication apparatus is constituted so that recording paper on which image data is printed is discharged to the same discharge tray regardless of which circuit was involved in the communication, the discharged sheets of recording paper can not be easily classified by circuit with the result that there arises a disadvantage such that the communication apparatus is inconvenient in usage.

Furthermore, in the prior art disclosed in JP-A 4-185071, the recording medium is designated by an instruction from the facsimile machine on the data transmitting side so that the image data received by the designated recording medium is recorded and outputted. However, for example, when the communication apparatus of the prior art is constituted in connection with the plurality of telephone circuits, the recording paper on which the received image data is printed is discharged to the discharge tray of the printing device when the printing device is constantly designated from the same discharge tray, for example, from the facsimile machine on the data transmitting side without depending on the circuit. Consequently, in the same manner as the prior art described above, the discharged sheets of recording paper can not be easily classified by circuit with the result that there arises a disadvantage such that the communication apparatus is inconvenient in usage.

SUMMARY OF THE INVENTION

An object of the invention is to provide a communication apparatus connected with a plurality of circuits, which is capable of discharging recording paper on which received image data is printed, to discharge trays which are individually provided for the respective circuits, and easily classify the discharged sheets of recording paper by circuit.

The invention provides a communication apparatus used individually in connection with a plurality of circuits, in which received image data is printed on recording paper and the printed recording paper is discharged to a discharge part, the apparatus comprising a plurality of discharge parts, wherein the discharge parts of the recording paper on which the received data is printed, are individually provided for the respective circuits.

According to the invention, the communication apparatus used individually in connection with a plurality of circuits prints the received image data on the recording paper to discharge the recording paper to the plurality of discharge parts which are individually provided for the respective circuits.

Consequently, the discharged sheets of recording paper can be easily classified by circuit.

The invention is characterized in that the communication apparatus further comprises:

circuit identification information memory means for memorizing circuit identification information for identifying a circuit which was applied to receiving data;

reference circuit identification information memory means for memorizing reference circuit identification information for identifying circuits and a plurality of discharge parts in individual correspondence between the circuits and the plurality of discharge parts;

printing instruction means for issuing an instruction of printing the received image data; and control means for selecting, upon issue of an instruction of printing the image data by the printing instruction means, a discharge part which corresponds to the reference circuit identification information which coincides with the circuit identification information memorized in the circuit identification memory means, printing the image data on the recording paper and discharging the recording paper to the selected discharge part.

According to the invention, upon issue of the instruction of printing the received image data, a discharge part which is allowed to correspond to the reference circuit identification information which coincides with the circuit identification information memorized in the circuit identification information memory means is selected. The received image data is printed on the recording paper and the recording paper is discharged to the selected discharge part. Consequently, the printed recording paper is discharged to one of the discharge parts which are individually provided for the respective circuits, so that the sheets of recording paper can be easily classified by circuit.

As described above, according to the invention, the communication apparatus used individually in connection with the plurality of circuits, the received image data is printed on the recording paper and the printed recording paper is discharged to one of the plurality of discharge parts which are individually provided for the respective circuits with the result that the discharged sheets of recording paper can be easily classified by circuit.

In addition, according to the present invention, when the printing of the image data is instructed, the discharge part corresponding to the reference circuit identification information which coincides with the circuit identification information memorized in the circuit identification information memory means is selected from the reference circuit identification information memory means. The received image information is printed on the recording paper and the printed recording paper is discharged to the selected discharge part. Consequently, the printed recording paper is discharged to the discharged part selected from among of the discharge parts which are different from one circuit to another, so that the recording paper can be easily detected.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
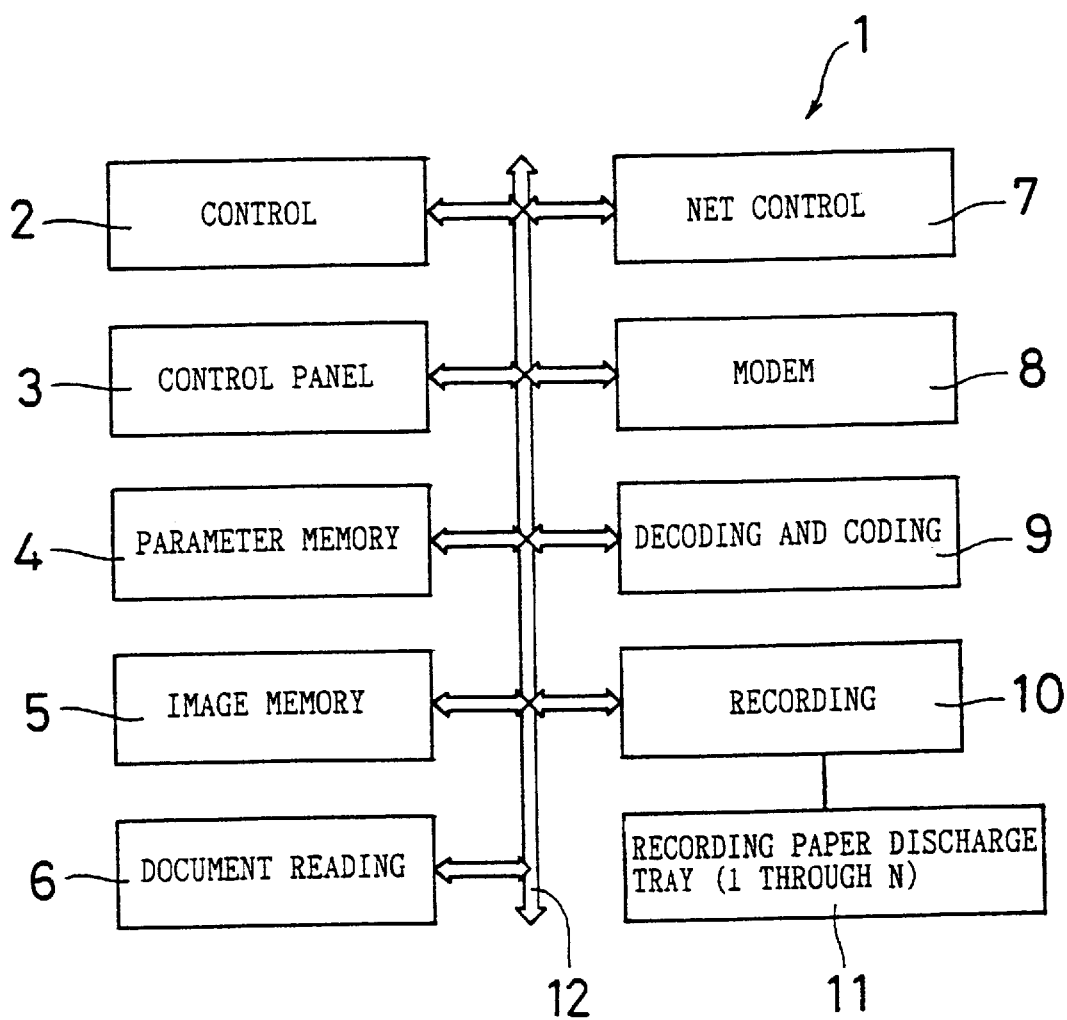
FIG. 1 is a block diagram showing an electric structure of a communication apparatus 1 of an embodiment of the invention.

Now referring to the drawings, preferred embodiments of the invention are described below.

FIG. 1 is a block diagram showing an electric structure of a communication apparatus of an embodiment of the invention. The communication apparatus 1 is a facsimile communication apparatus which comprises a control part 2, a control panel 3, a parameter memory part 4, an image memory part 5, a document reading part 6, a net control part 7, a modem 8, a decoding and coding part 9, a recording part 10 to which a recording paper discharge tray part 11 is connected. Each of the constituent parts are connected to each other via a system bus 12. The communication part 1 is connected to a plurality (N) of telephone circuits via the net control part 7. The communication apparatus 1 includes N communication control parts individually connected, for example, to N telephone circuits. The communication apparatus 1 receives image data P from each of the telephone circuits via the net control part 7.

The control part 2 controls an operation of the communication apparatus 1 as a whole. An operator designates a data transmission operation and a data receiving operation via the control panel 3. For this purpose, the control panel 3 has keys and a display part for displaying each kind of instruction.

The parameter memory part 4 comprises a control table of the received information, a table for tray selection, and an image file table. The image memory part 5 memorizes as one image file image data to be transmitted which is read by the image reading part 6. Furthermore, the received image data is memorized as one image file.

The net control part 7 carries out the data transmitting and receiving operation in accordance with a predetermined facsimile communication control procedure. Specifically, at the time of transmitting the data, a dial number which is inputted in advance, or a dial number which is being inputted is transmitted from a predetermined circuit so that a data transmitting and receiving operation is carried out in accordance with a predetermined facsimile communication control procedure. At the time of transmitting the data, the data receiving operation is carried out in accordance with the predetermined facsimile communication control procedure by receiving a call signal from the telephone circuits.

A modem 8 modulates and demodulates transmitted and received data for exchanging information with a communication apparatus on the opposite side via a telephone circuit. For example, the communication apparatus provides a relatively slow speed modem function (V. 21) for modulating and demodulating a predetermined facsimile communication procedure signal and a relatively high speed modem function (V. 33. V. 17. V. 29. V. 27) for modulating and demodulating the image data signal.

The decoding and coding part 9 codes the image data to be transmitted, and decodes the received image data. The recording part 10 prints the received image data. The recording paper discharge tray part 11 has a plurality (N) of trays T to which the recording paper on which the received data is printed is discharged, and a tray is selected in accordance with a circuit which has received the image data.

At the time of transmitting the data, the net control part 7 sends a dial number to carry out the data transmitting operation in accordance with the predetermined facsimile communication control procedure so that the data is memorized in the image memory part 5 and is coded with the decoding and coding part 9. Then the image data to be transmitted which are sequentially modulated with the modem 8 are transmitted to the telephone circuit. After the data is read with the image reading part 6, the data is coded with the data decoding and coding part 9 so that the image data can be sequentially converted with the modem 8 to be transmitted.

On the other hand, at the time of receiving the data, the net control part 7 detects the call signal from the telephone circuit to carry out the data transmitting operation in accordance with the predetermined communication control procedures. The received image data is sequentially modulated with the modem 8 and the modulated image data is memorized in the image memory part 5. When the image data which is memorized in the image memory part 5 is printed with the recording part 10, the image data is decoded with the decoding and coding part 9.

Figure 2:
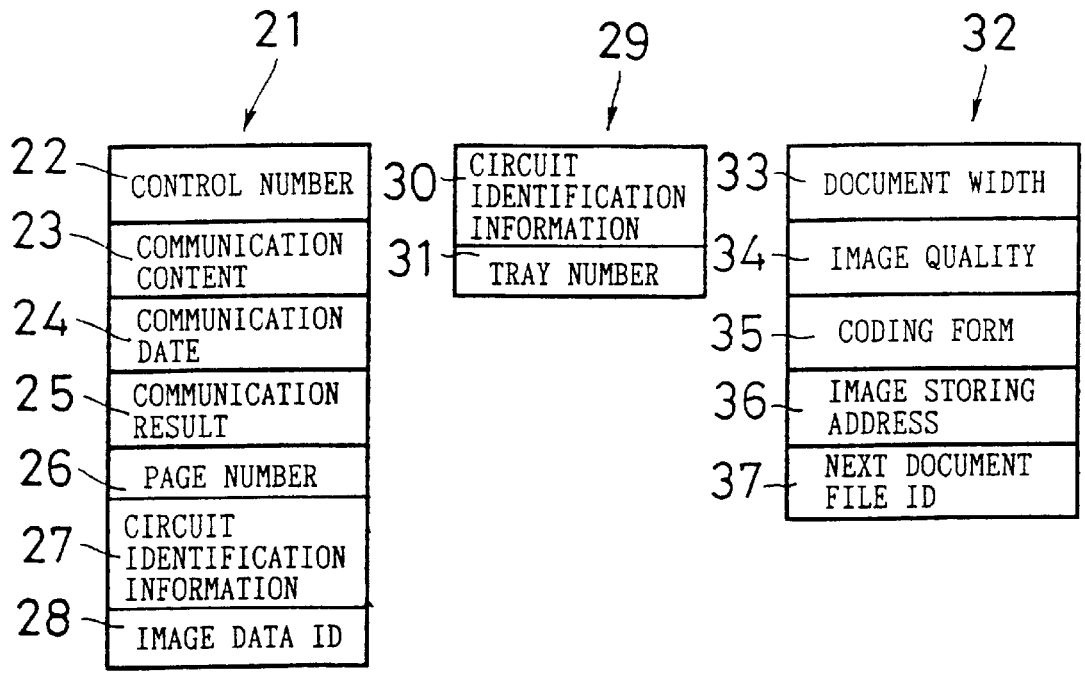
FIGS. 2A to 2C are views showing a control table 21 of received information which a parameter memory part 4 has, a table 29 for tray selection and a image file table 32, respectively.

FIGS. 2A to 2C are views showing a control table 21 of the received information which the parameter memory part 4 has, a table 29 for tray selection, and an image file table 32, respectively.

The control table 21 of the received information shown in FIG. 2A comprises a control number 22 for identifying a receiving control tables which are prepared in plurality, a communication content 23 for identifying a receiving form such as a normal receiving form, a polling receiving form, a substitute receiving form, a communication date 24 for identifying the received date, and a communication result 25 for identifying the received result, a page number 26 for identifying the number of pages, or an image data amount of the received image data, circuit identification information 27 for identifying a reception circuit, and image data ID 28 for identifying the image file table where the received image data is stored. The circuit identification information includes number information for identifying the number of the circuits, and type information for identifying the types of the circuits.

The table 29 for tray selection shown in FIG. 2B is constituted by comprising circuit identification information 30 including the number information for identifying the number of the circuits and the type information for identifying the types of the circuits for identifying the circuits, a tray number 31 for identifying a plurality of trays incorporated in the recording paper discharge tray part 11. The table 29 is a table for associating the circuit identification information and the trays.

The image file table 32 shown in FIG. 2C is constituted by comprising a document width 33 for identifying a document width as to whether the document width of the image file is, for example, an A4 size or a B4 size, an image quality 34 for identifying a resolution of the image file, a coding form 35 for identifying the coding form of the image file such as an MH form, an MR form and an MMR form, an image storing address 36 for identifying a head address of the image file, and a next document file ID 37 where an ID code of the image file table for identifying the image file of the next page. Incidentally, the next document file ID 37 includes a code for representing the last page when the next document file is the last page.

Figure 3:
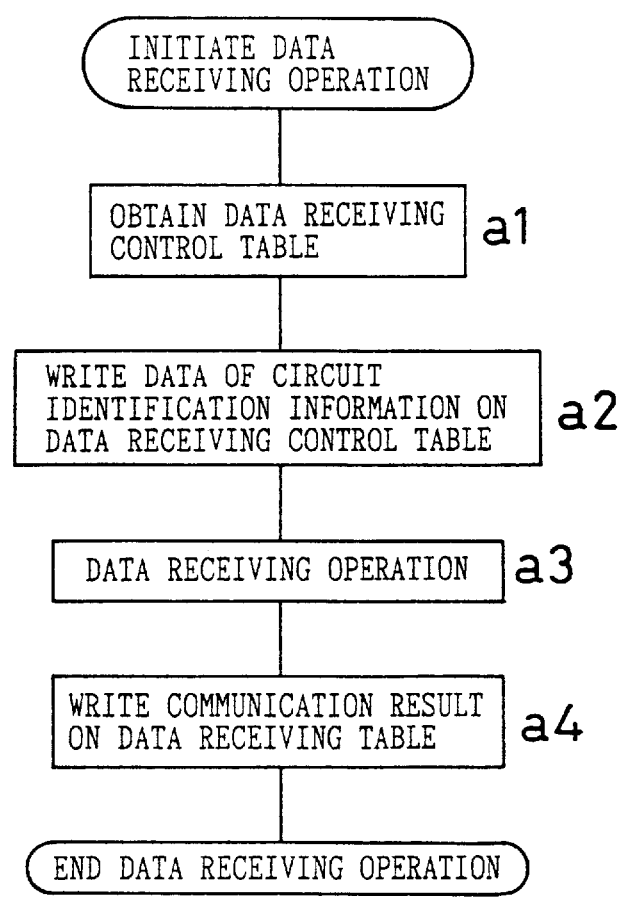
FIG. 3 is a flowchart showing a receiving operation of the communication apparatus 1.

FIG. 3 is a flowchart showing the data receiving operation of the communication apparatus 1. At step a1 at which the net control part 7 detects the call signal from the telephone circuit and the data receiving operation is carried out in accordance with the predetermined facsimile communication procedure, the control table 21 of the received information shown in FIG. 2A is obtained. In the control table 21 of the received information which has been obtained, each parameter is initialized, and further the control number 22, the communication content 23 and the communication date 24 are written there.

At step a2, the circuit identification information 27 is written. At step a3, the image data is received in accordance with the predetermined facsimile communication procedure. The received information is sequentially demodulated with the modem 8. At this time, the image file table 32 showing the received image is prepared. Furthermore, the page number 26 of the control table 21 is renewed. For example, on the first page, the ID code of the image file table 32 on the first page is written on the image data ID 28. At step a4, the communication result 25 is written thereby ending the data receiving operation.

Incidentally, for example, when the recording part 10 is printing and outputting the other image data, the recording paper has run out, or it is impossible to print the image data the moment the image data is received, a data receiving operation similar to as the data receiving operation described above is carried out even in the case where the substitute receiving operation or the polling receiving operation is carried out for temporarily memorizing the received image data in the image memory part 5.

Figure 4:
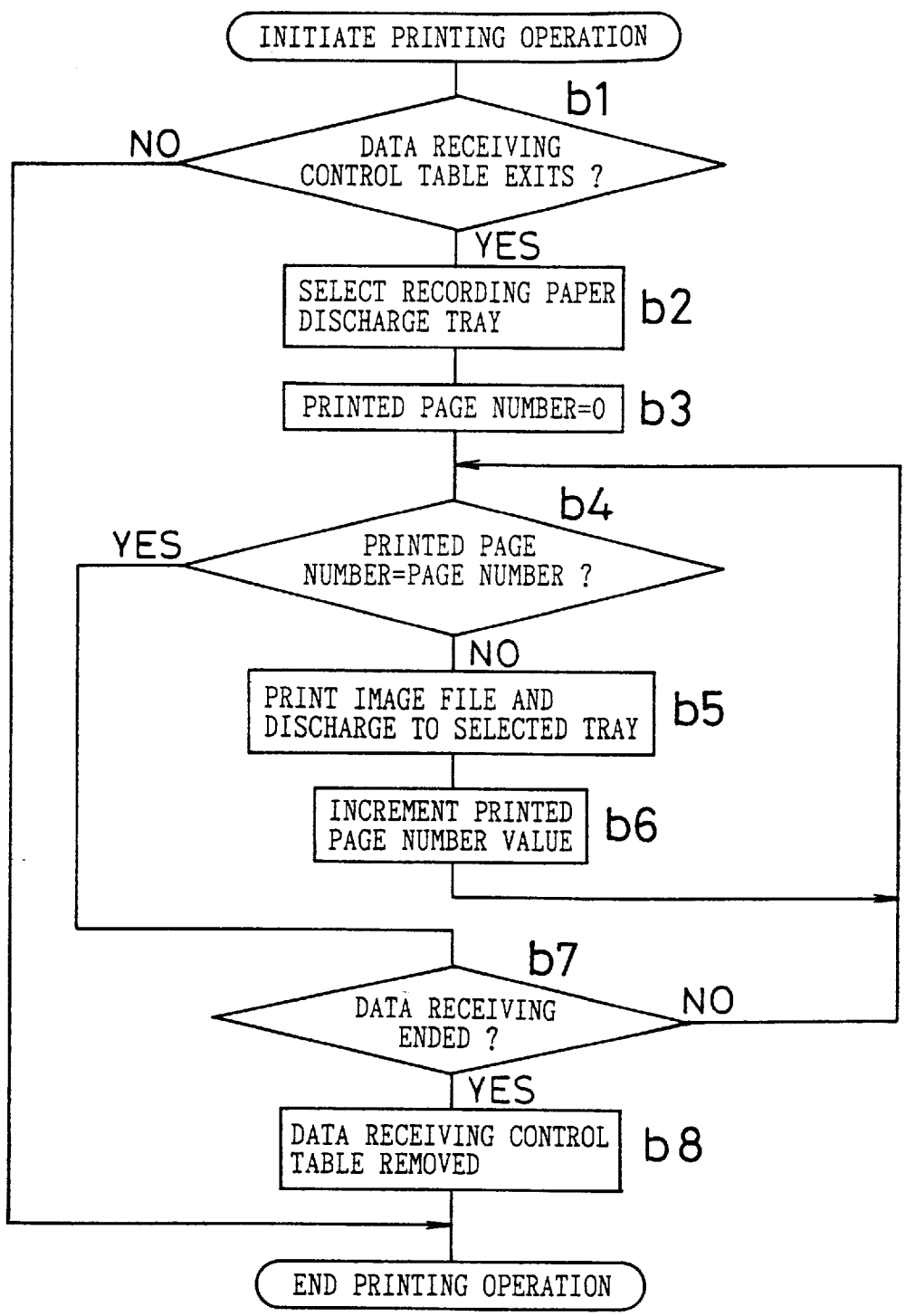
FIG. 4 is a flowchart showing a printing and outputting operation of image data which is received by the communication apparatus 1.

FIG. 4 is a flowchart showing an image data printing and outputting operation of the image data received by the communication apparatus 1.

At step b1, it is judged whether or not the control table 21 of the received information is prepared. When it is judged that the control table 21 is not prepared, the printing and outputting operation is ended. At step b2 at which it is judged that the control table 21 is prepared, the table 29 for tray selection which has circuit identification information 30 which coincides with the circuit identification information 27 of the control table 21 is retrieved so that a tray number of the retrieved table 29 for the tray selection is obtained. At step b3, the printed page number is initialized to set the number to "0".

At step b4, it is judged whether or not the printed page number coincides with the page number 26 of the control table 21. When the printed page number coincides with the page number 26 of the control table 21, the process proceeds to step b7. When the printed page number does not agree with the page number 26 of the control table 21, the process proceeds to step b5. At step b5, the image data on the page (represented by a number obtained by adding 1 to the number of printed pages) is printed out with the recording part 10. Then the recording paper having the image data printed thereon is discharged to the tray selected at step b2. Incidentally, in the case where the image data is printed after the image data is temporarily memorized in the image memory part 5, the image storing address 36 is referred to and the image data is read from the corresponding image file and is printed and outputted with the recording part 10. At step b6, the printed page number is incremented to add 1 thereto. When the processing at step b6 is ended, the process returns to the step b4 described above.

At step b7 where the printed page number coincides with the page number 26 of the control table 21, it is judged whether or not the data receiving operation is ended. In other words, it is judged whether or not the communication result on the control table 21 indicates the end of the data receiving operation. When it is judged that the data receiving operation is not ended, the process returns to step b4. On the other hand, when it is judged that the data receiving operation is ended, the process proceeds to step b8. At the step b8, the setting of the control table 21 is eliminated.

Figure 5A:
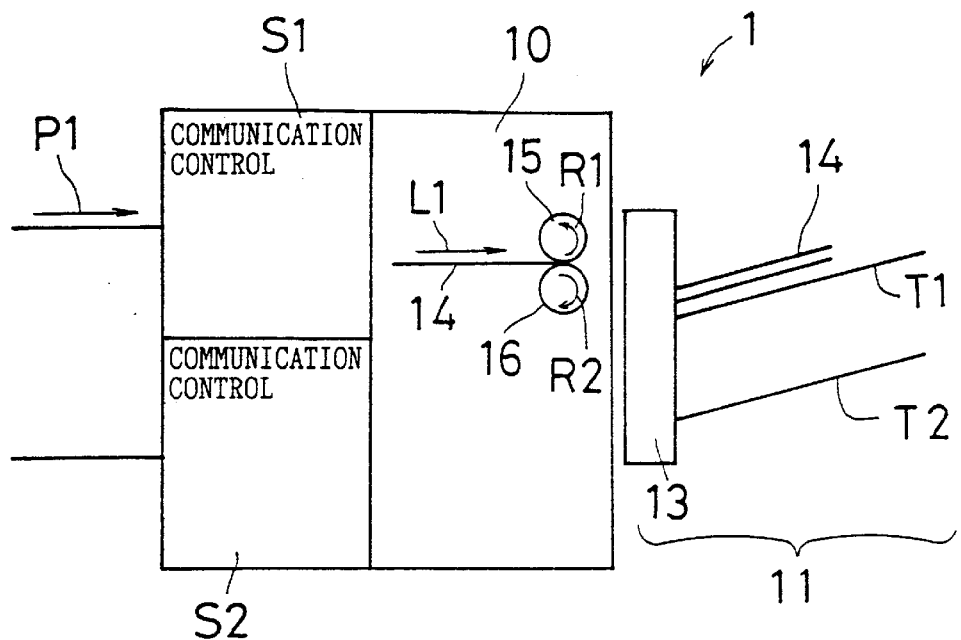
FIGS. 5A and 5B are side views showing a printing and an outputting operation of the communication apparatus 1.
Figure 5B:
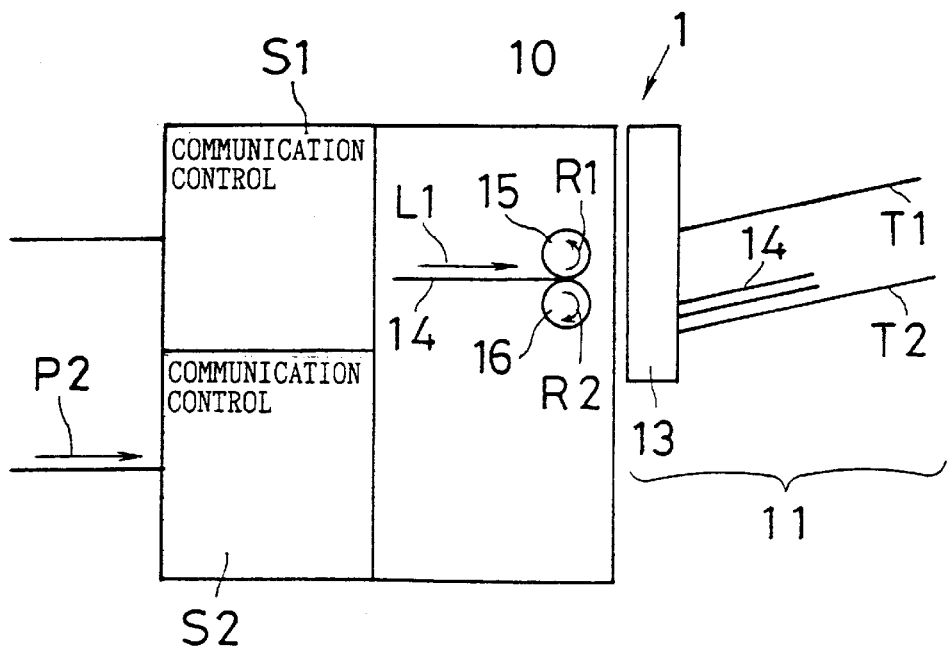

FIGS. 5A and 5B are side views showing a printing and an outputting operation of the communication apparatus 1. For example, there is explained an example in which the net control part 7 has two communication parts S1 and S2 individually connected to the telephone circuits, and the recording paper discharge tray part 11 has two trays T1 and T2, and a tray selection part 13 which lifts and lowers and displaces the trays T1 and T2. As shown in FIG. 5A, the image data P1 which is received with the telephone circuit connected to one side communication control part S1 and is printed on the recording paper 14. The recording paper 14 is rotated in opposite directions R1 and R2 to each other and is discharged to a tray along a discharge direction with discharge rollers 15 and 16 disposed immediately before the discharge tray. At this time, the tray selection part 13 lifts and lowers and displaces the trays T1 and T2 so that the discharge port of the recording paper 14 is located adjacent to the tray T1. Consequently, the recording paper which is discharged is discharged to the tray T1.

The image data P2 which is received with the telephone circuit connected to the other communication control part S2 is also given to the recording part 10 via the communication control part S2 in the same manner as shown in FIG. 5B so that the image data P2 is printed on the recording paper. The recording paper 14 is discharged to the tray along the discharge direction L1. At this time, the tray selection part 13 raises and lowers, and displaces the trays T1 and T2 so that the discharge part of the tray selection part is located adjacent to the tray T2. Consequently, the recording paper to be discharged will be discharged to the tray T2.

As described above, according to the present embodiment, the communication apparatus 1 used individually in connection with the plurality of circuits prints the received image data on the recording paper 14 to discharge the recording paper 14 to the plurality of trays T1 and T2 which are different for each of the circuits. In other words, the printing of the image data is designated from the control panel 3, the tray number which is allowed to correspond to the circuit identification information 30 of the table 29 for the tray selection which coincides with the circuit identification information 27 which is memorized in the control table 21 of the received information which is the circuit identification information memory means is selected. The received image data is printed on the recording paper 14 so that the recording paper 14 is discharged to the selected tray. Consequently, the printed recording paper 14 is discharged to the tray which is different for each of the circuits so that the sheets of recording paper 14 can be easily classified for each of the circuits.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus comprising:

means for receiving image data from a plurality of distinct different circuits;

means for printing the image data on a recording paper;

a plurality of discharge parts, each one of the plurality of discharge parts provided for each one of the distinct different circuits;

circuit identification information memory means for memorizing circuit identification information for identifying a circuit of the plurality of distinct different circuits;

reference circuit identification information memory means for memorizing reference circuit identification information for identifying one of the distinct different circuits and one of the plurality of discharge parts provided for the one distinct different circuits in individual correspondence between the circuits and the plurality of discharge parts;

means for modulating and demodulating receipt of image data at different speeds;

printing instruction means for issuing an instruction of printing the received image data; and control means for selecting, upon issue of an instruction of printing the image data by the printing instruction means, a discharge part which corresponds to the reference circuit identification information and printing the image data on the recording paper and discharging the recording paper to the selected discharge part.

2. The communication apparatus according to claims 1, further comprising:

a plurality of communication portions;

each one of the communication portions connected to a different distinct image sending circuits;

means for discharging the recording paper after printing to a selected one of a plurality of receiving parts; and means for selecting one of the plurality of receiving parts by movement.

3. The communication apparatus according to claim 2, wherein the circuits are telephone circuits and the receiving parts are trays.

4. The communication apparatus according to claim 3, wherein the means for selecting physically moves the trays in a first direction and a second direction which is opposite to the first direction, so that upon printing and discharging the recording paper a tray which directly corresponds a specific circuit will be the only tray to receive the recording medium.

* * * * *